RE 26051

Aug. 4, 1959  H. L. HOKE  2,897,568
CONDUIT CLAMP

Filed Aug. 20, 1957  3 Sheets-Sheet 1

Aug. 4, 1959 H. L. HOKE 2,897,568
CONDUIT CLAMP

Filed Aug. 20, 1957 3 Sheets-Sheet 2

Aug. 4, 1959  H. L. HOKE  2,897,568
CONDUIT CLAMP

Filed Aug. 20, 1957  3 Sheets-Sheet 3

# United States Patent Office 2,897,568
Patented Aug. 4, 1959

2,897,568

CONDUIT CLAMP

Howard L. Hoke, Bradford, Pa., assignor to Dresser Industries, Inc., Dallas, Pa., a corporation of Delaware Application August 20, 1957, Serial No. 679,168

12 Claims. (Cl. 24—279)

The present invention relates to conduit clamps and particularly to clamps comprising a split sleeve around the conduit, side bars or lugs secured to the ends of the split sleeve and tension means for drawing the side bars or lugs toward one another to tighten the clamp on the conduit. The invention is particularly applicable to so called band clamps used for repairing cracks or holes in pipes and comprising a strip or patch of rubber or other gasket material applied to the pipe over the hole, a metal band extending around the pipe over the gasket, bolt lugs provided at the ends of the band and one or more bolts acting between the lugs to draw the band tight and thereby press the gasket material against the pipe to close the hole.

A long standing problem with clamps of this nature arises from the fact that since the pull of the bolts or other tension means on the lugs is not in line with the resistance of the sleeve, the lugs are subjected to moments tending to roll them toward one another. This rolling action may be sufficient to make the lugs bind on the bolts so that it is difficult to draw the lugs together to apply tension to the sleeve. If the lugs roll to the extent that their radially outer portions meet, much of the pull of the bolts it dissipated and the amount the ends of sleeve can be pulled together is limited. The rolling of the lugs may also tend to weaken the attachment of the lugs to the sleeve. If it is attempted to prevent rolling by securing rear portions of the lugs to the sleeve, the result is that portions of the sleeve to which the rear portions of the lugs are attached are pulled out away from the conduit so that virtually no pressure is applied in those areas.

It is an object of the present invention to prevent the rolling of the side bars or lugs so that they remain parallel to one another and substantially the entire pull of the bolts or the tension means is utilized in moving the lugs rectilinearly toward one another to apply tension to the sleeve. In accordance with the invention, each of the lugs is provided with one or more bearing surfaces extending substantially parallel to the direction of pull of the bolts or other tension means and with circumferentially extending portions projecting beyond the base of the respective lug and slidably bearing in a radial direction on the corresponding bearing surface of the other lug to resist rolling of the lugs by the pull of the tension means. The lugs hence move toward one another with a rectilinear, non-rolling movement and substantially the full effort of the tension means is applied to drawing the split sleeve tight on the conduit. Moreover, the elimination of rolling avoids weakening the attachment of the lugs to the split sleeve.

Another object of the invention is to provide a novel and improved means for attaching the side bars or lugs to the ends of the split sleeve in an economical, convenient and effective manner.

Other objects and advantages of the invention will be understood from the following description and claims in conjunction with the accompanying drawings which show by way of example preferred embodiments of the invention and in which:

Figure 1:
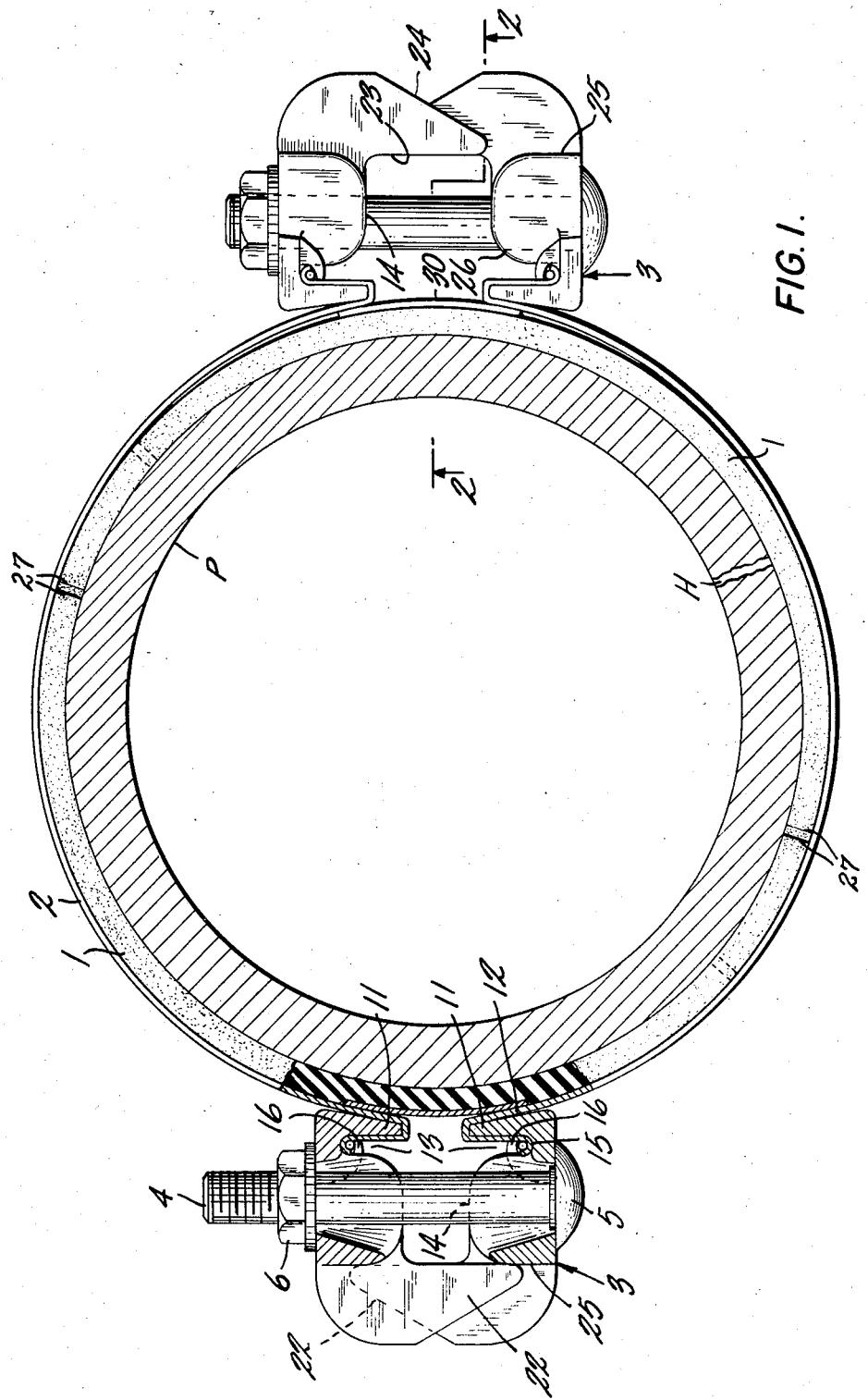
Fig. 1 is a view showing a clamp in accordance with the invention applied to a pipe, the view being taken in planes perpendicular to the axis of the pipe and showing one pair of lugs in cross section and another in end elevation.
Figure 2:
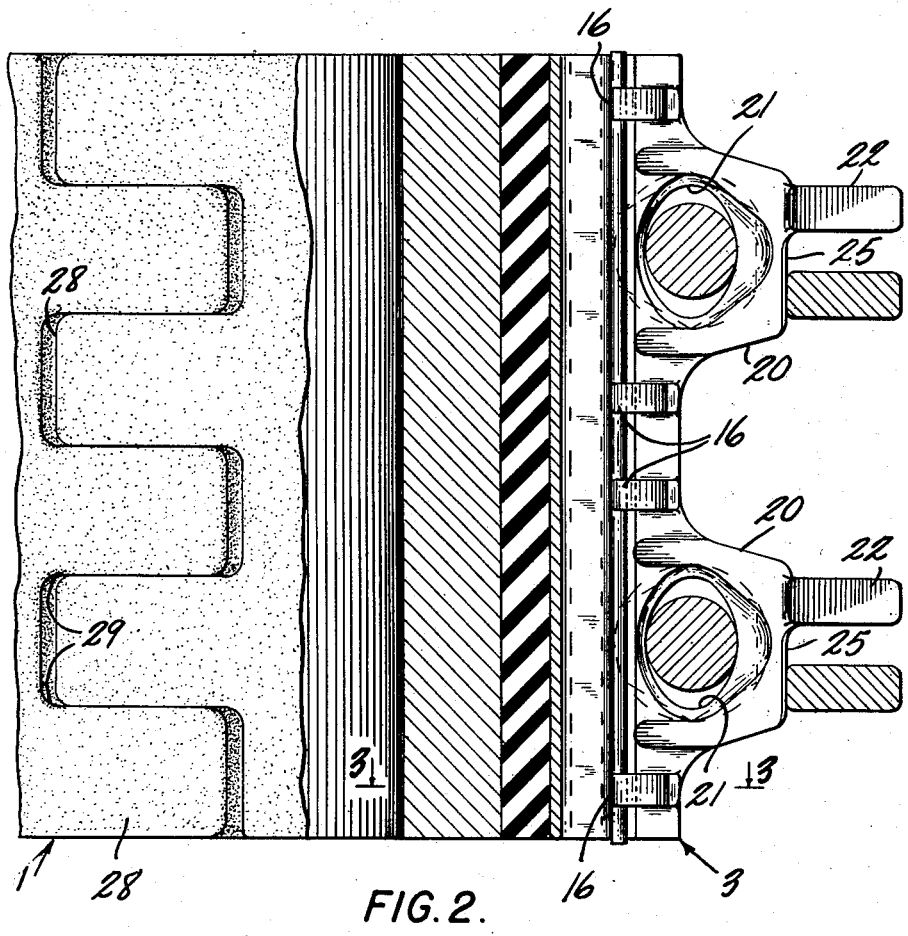
Fig. 2 is a radial section taken approximately on the line 2—2 in Fig. 1.
Figure 3:
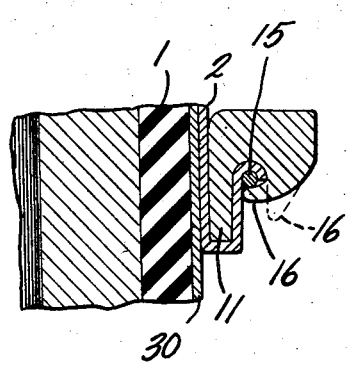
Fig. 3 is a fragmentary cross section taken approximately on the line 3—3 in Fig. 2.

In Figs. 1 to 3 a clamp in accordance with the invention is shown applied to a pipe P to repair a crack or hole H. The clamp comprises a gasket 1 applied to the surface of the pipe over the hole H, a split sleeve extending around the pipe over the gasket, side bars or lugs 3 secured to the ends of the split sleeve and tension means in the form of bolts 4 with heads 5 and nuts 6 for pulling the lugs together to draw the split sleeve 2 tightly about the pipe and thereby press the gasket against the pipe wall to provide a fluid tight seal and thereby prevent leakage through the crack or hole H.

The split sleeve 2 is shown in the form of a flexible metal band to the ends of which the lugs 3 are attached. The band is shown as comprising two arcuate halves or sections with a pair of lugs at each side of the pipe. The sections may be preformed to arcuate shape or alternatively are sufficiently flexible to bend readily to the curvature of the pipe. If desired, the sleeve may comprise a single section extending around the pipe, with a single pair of lugs secured to its ends, the band being sufficiently flexible to permit separation of the ends to pass over the pipe. Alternatively, more than two sections may be used for example when the pipe is of larger diameter and it is desired to keep the sections relatively short.

The side bars or lugs 3 extend transversely of the band 2 and hence parallel to the axis of the pipe. In the embodiment shown in Figs. 1 to 3, all of the four lugs are identical. It will be understood, however, that the two lugs of a pair are reversed so that they face one another when the clamp is assembled on a pipe. Each of the lugs 3 has a lip portion 11 which extends lengthwise of the lug and hence transversely of the band 2. The lip 11 is defined by the radially inner surface 12 of the lug and the inner surface of a recess 13 that extends the full length of the lug and opens at the forward face 14 of the lug. The band 2 engages the inner face 12 of the lug, is bent around the lip 11 and extends into the recess 13. At its end, the band 2 is curled at least part way around a small rod or wire 15 which lies in the bottom of the recess and extends lengthwise of the lug. The end edge of the band 2 may, if desired, be brazed, welded or otherwise secured to the wire 15 but this is not necessary. The wire 15 and the engaging end portion of the band 2 are secured in the recess 13 by a plurality of fingers 16, four such fingers being shown by way of example in Fig. 2. The fingers 16 are preferably integral with the lug and project into the recess 13 in a direction toward the face of the lug. They are initially approximately parallel to and spaced from the radially outer face of the lip portion 11 as shown in broken lines in Fig. 3. After the end portion of the band 2 and the wire 15 has been inserted in the recess 13 the fingers 16 are bent radially inwardly toward the lip portion 11 to grip the wire and band and thereby secure the end portion of the band 2 in the recess 13 of the lug.

The side bars or lugs 3 have portions 20 that extend radially outwardly and are apertured to provide bolt holes 21. One or more bolts are used, depending on the width of the band 2 and the amount of tension it is desired to apply to the band. In Fig. 2 the lug is shown as having two bolt holes. Each of the holes is shown as being oval in cross sectional shape to receive a track head bolt. Moreover, the walls of the hole are shown diverging in a direction toward the face of the lug (Fig. 1) to assure that the bolt holes of the lugs do not bind on the bolts.

When the bolts are tightened the heads and nuts of the bolts exert forces in line with the bolts tending to pull the lugs toward one another while the ends of the band 2 exert forces in the opposite direction on the lip portion 11 of the lug. Since the bolts 4 are located radially outwardly of the lip portions 11, the forces exerted on the lugs by the bolts and the band respectively produce moments tending to cause the radially outer portions of the lugs to roll toward one another. Thus referring to the left hand portion of Fig. 1 the lower lug tends to roll in a clockwise direction while the upper lug tends to roll in a counterclockwise direction. It is an object of the present invention to resist this tendency of the lugs to roll.

In accordance with the invention, each of the side bars or lugs 3 is provided with one or more arm portions 22 that project forwardly beyond the front face of the lug in a direction circumferential of the pipe. In the embodiment shown in Fig. 2, each lug is provided with two such arms, one on each of the radially outwardly projecting portions 20. Each of the arms 22 is shown as having a radially inner face 23 (Fig. 1) that is approximately parallel to the bolt 4 and an inclined outer face 24 so that the arm is tapered. The arm 22 is located radially outwardly of its respective bolt and is offset laterally from the center of the bolt as will be seen in Fig. 2. Alongside each of the arms 22 the lug is provided with a bearing surface 25 which extends substantially parallel to the bolt 4 and is in substantially the same plane as the inner face 23 of the arm 22. The bearing surface 25 on each of the outwardly projecting portions 20 of the lug is offset from a plane perpendicular to the axis of the pipe and passing through the center of the associated bolt 5, the amount of offset being approximately equal to that of projecting arm 22. Hence when the two lugs of a pair are reversed so as to face one another (Fig. 1) and the bolt holes of the lugs are aligned, the inner surfaces 23 of the arms 22 of one lug engage the bearing surfaces 25 of the other. As will be seen in Fig. 1, each of the arms 22 bears in a radial direction on the corresponding bearing surface 25 of the other lug and is slidable on the bearing surface in a direction approximately parallel to the bolt 4. It will further be seen that engagement of the arms 22 with the corresponding bearing surfaces 25 prevents the rolling of the lugs. Thus considering the upper lug at the left hand side of Fig. 1 the pull of the bolt 4 and the reactance of the band 2 produce a moment tending to cause the lug to roll in a counterclockwise direction. However, in order for the lug to roll, the outer (lower) end of the arm 22 would have to move radially inwardly toward the pipe. However, such movement is prevented by engagement of the arm 22 with the bearing surface 25 of the lower lug. Hence, the arm 22 serves as a torque arm which effectively resists the twisting moment applied to the lug by the pull of the bolt and the reaction of the split sleeve. As viewed in cross section (Fig. 1), the body portion of the lug including the inner lip 11 constitutes one arm of a bell crank lever while the torque arm 22 constitutes the other arm. The moment exerted on the lug by the pull of the bolt and the reaction of the split sleeve is counteracted by engagement of the arm 22 with the bearing surface of the other lug so that as the nuts 6 are tightened on the bolts 4 the lugs are drawn toward one another with a rectilinear or translational movement as distinguished from a rolling movement. As the torque arms 22 bear on the corresponding bearing surfaces 25 of the other lugs in a radial direction, the forces acting between the torque arms and the bearing surface—other than frictional forces—do not oppose the pull of the bolts. Hence, as the nuts are tightened on the bolts, the two lugs are drawn toward one another with a translational movement and substantially the entire tension of the bolts is applied to the split sleeve. The arms 22 slide freely on the bearing surfaces 25 as the lugs are drawn together. The bearing surfaces 25 and the engaging surfaces of the arms 22 are preferably smooth and are of sufficiently large area to withstand design forces without galling so as to reduce friction to a minimum. Further reduction of friction may be obtained by suitable lubrication of the surfaces.

The gasket 1 is formed of suitable material to produce a fluid tight closure for the hole H in the pipe P when pressed against the pipe by the split sleeve 2. Rubber or other elastomeric materials are suitable for this purpose. The gasket may, if desired, be in the form of a local patch covering only the hole and a surrounding area. However, in Fig. 1 there is shown a full circle gasket extending entirely around the pipe and comprising two approximately semi-circular sections which are secured respectively—for example by adhesive—to the inner faces of the respective sections of the split sleeve. However, the ends 27 of the gasket sections are offset in a circumferential direction from the ends of the split sleeve sections so that the joints between the ends of the gasket sections do not occur at the spaces between the ends of the split sleeve sections. Preferably, the ends of the gaskets are defined by zig zag lines to provide spaced fingers 28 separated by spaces of the same width as the fingers so that when the clamp is assembled on the pipe the fingers on adjoining ends of the gasket intermesh with one another as illustrated in Fig. 2. This assures that the gasket will provide a fluid tight seal even though a hole or crack in the pipe occurs adjacent the joint between two ends of the gasket. Moreover, the intermeshing fingers permit the gasket to be used on pipes of different diameters while still providing a full circle gasket. A bridge plate or strip 30 bridges the gap between the ends of the split sleeve to confine the gasket and apply pressure to it. The bridge plate 30 is preferably formed of high strength, corrosion resistant material, for example stainless steel, so that it can be relatively thin and still have adequate strength. It is conveniently secured, for example adhesively, to the outer face of the gasket 1 so as to be in proper position to bridge the gap between the sleeve end when the clamp is assembled. In Fig. 1 the lugs at the right hand side are shown in loosely assembled condition. It will be seen that the portion of the gasket underlying the bridge plate 30 has the same thickness as the rest of the gasket. When the lugs 3 are drawn together by the bolts 4 as illustrated at the left hand side of Fig. 1, the bridge plate 30 is pressed into the gasket so that the gasket pressure at the bridge plate is increased. This tends to compensate for any decrease of pressure that might otherwise occur because of the fact that the central portion of the bridge plate is not directly supported by the split sleeve structure.

Figure 4:
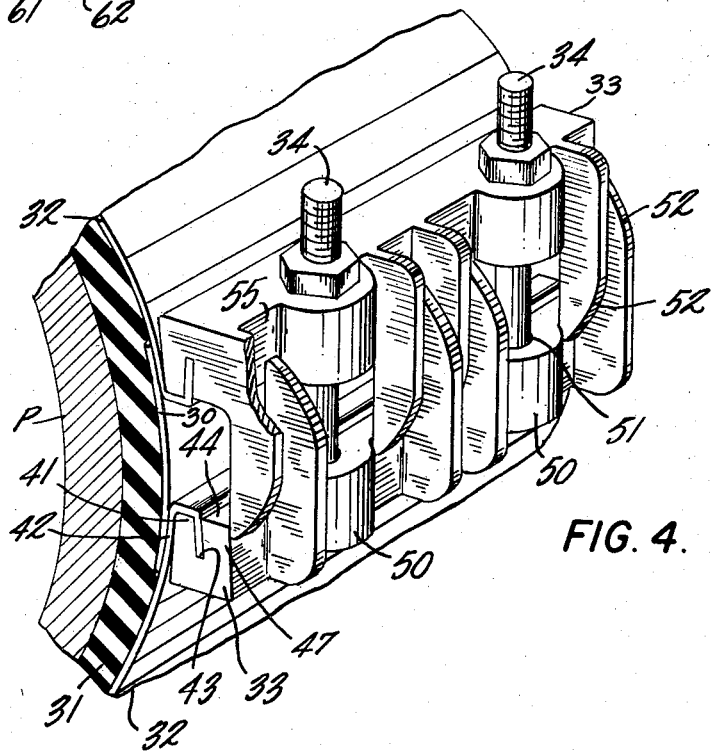
Fig. 4 is a schematic perspective view of another embodiment, portions being broken away and shown in sections.

Another embodiment is illustrated in Fig. 4 in which corresponding parts are indicated by the same reference numerals as in Figs. 1 to 3 with the addition of 30. The clamp comprises a gasket 31, a split sleeve in the form of a band 32, lugs 33 secured to the ends of the band and bolts 34 for drawing the lugs together. Each of the lugs has a longitudinally extending inner lip 41 defined by the inner surface 42 of the lug and a longitudinal channel 43 that extends inwardly from the front face 44 of the lug. The channel 43 is preferably in the form of a saw cut extending lengthwise of the lug. The band 32 engages the inner face 42 of the lug, is bent around over the inner lip 41 and has its end portion extending into the channel 43 between the inner lip 41 and an outer lip portion 47. The end portion of the band is conveniently secured in the channel 43 by pressing the inner and outer lips of the lug together with sufficient force to deform the material and permanently grip the end portion of the band 32.

Each of the lugs 33 is provided with radially outwardly projecting portions 50 which are apertured to provide bolt holes 51 for the bolts 34. Each of the lugs is also provided with a plurality of torque arms 52 which project forwardly beyond the front face 44 of the lug in a circumferential direction and engage corresponding bearing surfaces 55 provided on the other lug of the pair. It will be noted that the torque arms 52 and bearing surfaces 55 in Fig. 4 are located between the bolts and on the end portions of the lugs instead of on the radially projecting portions 50. The bearing surfaces 55 are approximately in a plane defined by the axes of the bolts 34. While each of the lugs has been shown with two bolt holes and four torque arms, it will be understood that they may be extended to greater length as desired with duplication of bolt holes, torque arms and bearing surfaces. Conversely, the lugs shown in Fig. 4 can be cut in half, each half having one bolt hole and two torque arms. Except as otherwise described, the clamp of Fig. 4 is like that of Figs. 1 to 3. Engagement of the torque arms 52 in a radial direction against the bearing surfaces 55 of the opposite lug prevents rolling of the lugs in like manner.

Figure 5:
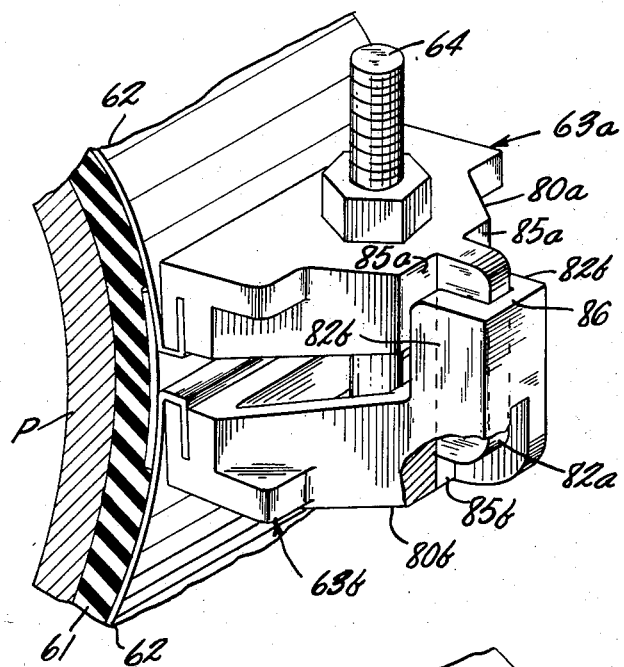
Fig. 5 is a schematic perspective view of a third embodiment with portions broken away and shown in sections.

A third embodiment of the invention is illustrated in Fig. 5 where corresponding parts are designated by the same reference numerals as in Figs. 1 to 3 with the addition of 60. The clamp comprises a gasket 61 and a split sleeve 62 having its ends secured respectively to lugs 63a and 63b which are adapted to be drawn toward one another by a bolt 64. The ends of the band 62 are shown secured to the lugs in the same manner as in Fig. 4. Each of the lugs has a portion 80a and 80b respectively that projects radially outwardly and is apertured to receive the bolt 64. However, in the embodiment of Fig. 5, the lugs are not identical. One of the lugs 63a has a single torque arm 82a which projects forwardly from the front face of the lug in a circumferential direction and bears in a radial direction on a bearing surface 85b of the other lug 63b. The latter lug 63b has two torque arms 82b which are disposed on opposite sides of the torque arm 82a and engage bearing surfaces 85a on the lug 63a. The two torque arms 82b are preferably connected by a bridge portion 86. The torque arms 82b may thus be considered as constituting a single torque arm of U-shaped cross section straddling the torque arm 82a of the lug 63a. It will be seen that the structure of the lugs is symmetrical with respect to a plane perpendicular to the axis of the pipe and passing through the axis of the bolt 64. The structure shown in Fig. 5 is particularly suitable for use with a narrower band 62 and a single bolt since the arrangement of the torque arms not only keeps the lugs from rolling but also assists in keeping the lugs in alignment and parallel to one another. However, it will be understood that the lugs may be extended and provided with more bolts, the structure shown in Fig. 5 being duplicated. Except as otherwise shown and described the clamp shown in Fig. 5 is like that of Figs. 1 to 3 and works in like manner.

It will be understood that the various constructional features of the embodiments illustrated in the drawings are mutually interchangeable and moreover that the invention is in no way limited to the particular embodiments shown by way of example in the drawings and herein described.

What I claim and desire to secure by Letters Patent is:

1. A conduit clamp comprising split sleeve means extending circumferentially of the conduit with opposite ends spaced circumferentially, a pair of lugs secured respectively to said spaced ends of said sleeve means, said lugs extending radially outwardly from said sleeve means and facing each other, tension means connecting said lugs with one another and operable to draw said lugs together, said tension means acting on said lugs radially outwardly of said sleeve means and applying a moment tending to roll the radially outer portions of said lugs toward one another, each of said lugs having a bearing surface extending substantially parallel to the direction of pull of said tension means and circumferentially extending portions projecting beyond the face of the respective lug and overlapping the bearing portions of the other of said lugs so as to bear in a radial direction on said bearing surface of the other of said lugs to resist the rolling of said lugs by the pull of said tension means, said circumferentially extending portions sliding in a circumferential direction on said bearing portions to guide said lugs in substantially rectilinear movement as they are drawn toward one another by said tension means.

2. A clamp according to claim 1, in which said bearing surfaces and said projecting portions are disposed radially outwardly of said tension means.

3. A conduit clamp comprising split sleeve means extending around the conduit with opposite ends spaced circumferentially, a pair of lugs secured respectively to said ends of said sleeve means, said lugs facing each other and having aligned bolt holes disposed radially outwardly of said sleeve means, at least one bolt extending through said holes and operative to draw said lugs toward one another, the pull of said bolt acting on said lugs radially outwardly of said sleeve means and thereby applying a moment tending to roll said lugs toward each other, each of said lugs having a bearing surface and at least one arm projecting circumferentially beyond the face of the respective lug and overlapping the bearing surface of the other of said lugs so as to bear on said bearing surface of the other of said lugs in a radial direction and slide on said surface in a direction parallel to said bolt to resist the rolling of said lugs and guide said lugs in substantially rectilinear movement as they are drawn toward one another by said bolt.

4. A conduit clamp according to claim 3, in which said sleeve means comprises a thin flexible band.

5. A conduit clamp comprising split sleeve means, extending around the conduit with opposite ends spaced circumferentially, a pair of lugs secured respectively to said ends of said sleeve means, said lugs facing each other and having aligned bolt holes disposed radially outwardly of said sleeve means, bolts extending through said holes and operative to draw said lugs toward one another, the pull of said bolts acting on said lugs radially outwardly of said sleeve means and thereby applying a movement tending to roll said lugs toward each other, each of said lugs having a plurality of bearing surfaces and a plurality of arms alternately arranged, said arms projecting circumferentially beyond the face of the respective lug and overlapping the bearing surfaces of the other of said lugs so as to bear on said bearing surfaces of the other of said lugs in a radial direction to resist the rolling of said lugs by the pull of said bolts, said projecting arms of each of said lugs being slidable on the bearing surfaces of the other of said lugs in a direction parallel to said bolts to guide said lugs in substantially rectilinear movement as they are drawn toward one another by said bolts.

6. A conduit clamp according to claim 5, in which said lugs are identical with one another.

7. A conduit clamp comprising split sleeve means extending around the conduit with opposite ends spaced circumferentially, a pair of lugs secured respectively to said ends of said sleeve means, said lugs facing each other and having aligned bolt holes disposed radially outwardly of said sleeve means, a bolt extending through said holes and operative to draw said lugs toward one another, the pull of said bolt acting on said lugs radially outwardly of said sleeve means and thereby applying a movement tending to roll said lugs toward each other, one of said lugs having an arm which is disposed radially outwardly of said bolt and which extends in a direction substantially parallel to said bolt and bears radially on the other of said lugs, said other lug having a pair of arms which are disposed on opposite sides of said first mentioned arm and which extend in a direction substantially parallel to said bolt and bear radially on said first mentioned lug, said arms being slidable on the lugs on which they bear in a direction parallel to said bolt as said bolt draws said lugs toward one another and restraining said lugs from rolling so that they move toward one another with a straight translational movement.

8. A conduit clamp comprising a pair of lugs extending lengthwise along one side of the conduit and facing one another, each of said lugs having an elongated lip adjacent the conduit and a recess radially outwardly of said lip, split sleeve means extending around the conduit and comprising a flexible band having end portions extending lengthwise of the conduit, each of said end portions extending between a respective one of said lugs and being bent back over said lip with the end of the band in said recess, means securing the end of said band in said recess, said lugs having aligned bolt holes disposed radially outwardly of said lugs, at least one bolt extending through said holes and operative to draw said lugs toward one another, the pull of said bolt acting on said lugs radially outwardly of the pull of said band to produce a moment tending to roll said lugs toward one another, each of said lugs having a bearing surface extending substantially parallel to said bolt and at least one torque arm projecting beyond the face of the lug and overlapping the bearing surface of the other of said lugs so as to bear in a radial direction on said bearing surface of the other of said lugs to resist the rolling of said lugs, said arms being slidable on said bearing surfaces in a direction substantially parallel to said bolt to guide said lugs in substantially rectilinear translating movement as said lugs are drawn toward one another by said bolt to apply tension to said band.

9. A conduit clamp according to claim 8, in which the means securing the end of said band in said recess of said lug comprises malleable fingers on said lug bent down to grip the end of said band between said fingers and said lip.

10. A conduit clamp according to claim 9, in which a bead is provided along the end of said band and in which said fingers grip said bead.

11. A conduit clamp comprising a pair of lugs extending in a lengthwise direction along one side of the conduit and facing one another, each of said lugs having a body portion, an elongated lip adjacent the conduit and an elongated recess radially outwardly of said lip on the front face of said lug and defined between said lip and body portion, split sleeve means extending around the conduit and comprising a flexible band having end portions extending lengthwise of the conduit, each of said end portions passing between the conduit and a respective one of said lugs and being bent back over said lip with the end of said band in said recess, a bead being provided along the end of said band, each of said lugs having spaced malleable fingers projecting forwardly from said body portion and bent down over the end portion of said band to grip said end portion between said fingers and said lip and secure said bead in said recess.

12. A conduit clamp according to claim 11, in which said bead comprises a wire and an end edge portion of said band bent at least part way around said wire.

References Cited in the file of this patent
UNITED STATES PATENTS

| | | |
|---|---|---|
| 866,876 | Meech | Sept. 24, 1907 |
| 875,293 | Scott | Dec. 31, 1907 |
| 1,907,889 | Stauffer | May 9, 1933 |
| 2,195,893 | McGann | Apr. 2, 1940 |
| 2,713,352 | Schustack | July 19, 1955 |